United States Patent [19]

Phillion et al.

[11] Patent Number: 5,590,903

[45] Date of Patent: Jan. 7, 1997

[54] DEPLOYMENT DOOR ASSEMBLY

[75] Inventors: Jack A. Phillion, Shelby Township; Scott A. Kelley, Algonac, both of Mich.

[73] Assignee: TRW Vehicle Safety Systems, Inc., Lyndhurst, Ohio

[21] Appl. No.: 538,501

[22] Filed: Sep. 29, 1995

[51] Int. Cl.$^6$ ................................................. B60R 21/20
[52] U.S. Cl. ........................................ 280/728.3; 280/732
[58] Field of Search ........................... 280/728.3, 732, 280/752, 730.1, 731, 728.2, 728.1

[56] References Cited

U.S. PATENT DOCUMENTS

| | | | |
|---|---|---|---|
| 3,801,126 | 4/1974 | Knight, IV et al. | 280/732 |
| 3,817,552 | 6/1974 | Knight, IV et al. | 280/732 |
| 4,770,439 | 9/1988 | Maier et al. | 280/732 |
| 4,893,833 | 1/1990 | DiSalvo et al. | 280/732 |
| 5,082,310 | 1/1992 | Bauer | 280/732 |
| 5,087,067 | 2/1992 | Seki et al. | 280/732 |
| 5,154,444 | 10/1992 | Nelson | 280/732 |
| 5,201,541 | 4/1993 | Jones et al. | 280/728.2 |
| 5,222,760 | 6/1993 | Rafferty | 280/728.3 |
| 5,333,901 | 8/1994 | Barnes | 280/732 |
| 5,395,668 | 3/1995 | Ito et al. | 280/728.3 |
| 5,447,328 | 9/1995 | Iannazzi et al. | 280/728.3 |
| 5,478,107 | 12/1995 | Yamagishi et al. | 280/728.3 |
| 5,487,558 | 1/1996 | Ball et al. | 280/728.3 |
| 5,498,027 | 3/1996 | Kelley et al. | 280/728.3 |

FOREIGN PATENT DOCUMENTS

| | | | |
|---|---|---|---|
| 1-122754 | 5/1989 | Japan | 280/728.3 |
| 4-78637 | 3/1992 | Japan | 280/728.3 |

OTHER PUBLICATIONS

Copending Patent Application Ser. No. 08/342,119 filed Nov. 18, 1994, entitled Deployment Door For Use In A Vehicle Occupant Restraint Apparatus.

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

A deployment structure (28) for use with an inflatable vehicle occupant restraint (12) is rupturable by the restraint (12) when the restraint (12) is being inflated. The deployment structure (28) includes a plastic part (52). The plastic part (52) has a seam (158) along which it is rupturable under stress induced by movement of the restraint (12) forcefully against the deployment structure (28). The plastic part (52) includes first and second bodies (150,152) of plastic foam which are joined to each other at the seam (158). The first and second bodies (150,152) of plastic foam preferably have respective values of durometer hardness that differ from each other.

15 Claims, 5 Drawing Sheets

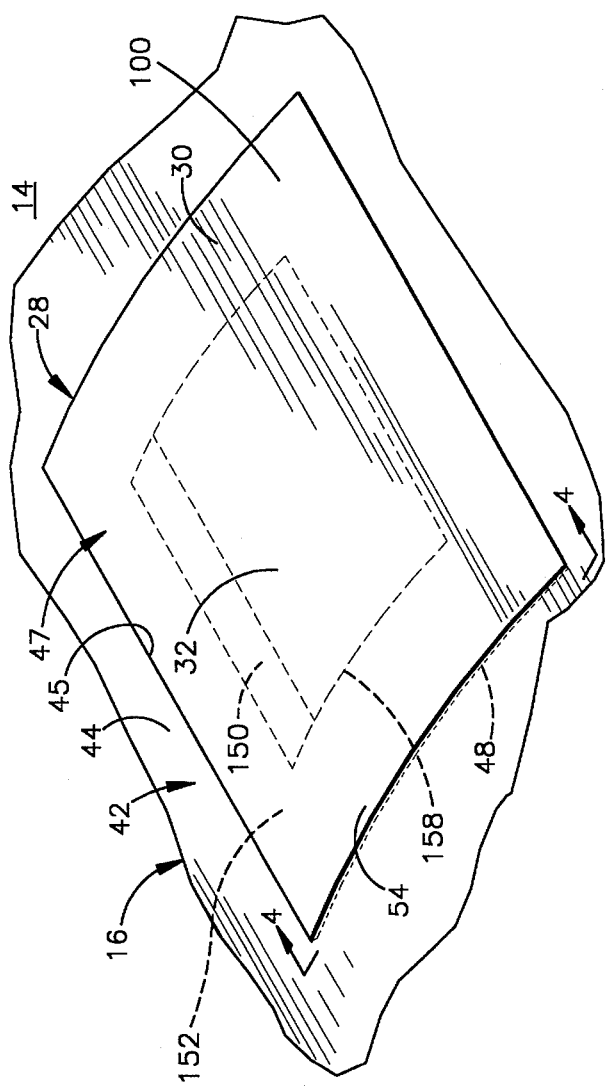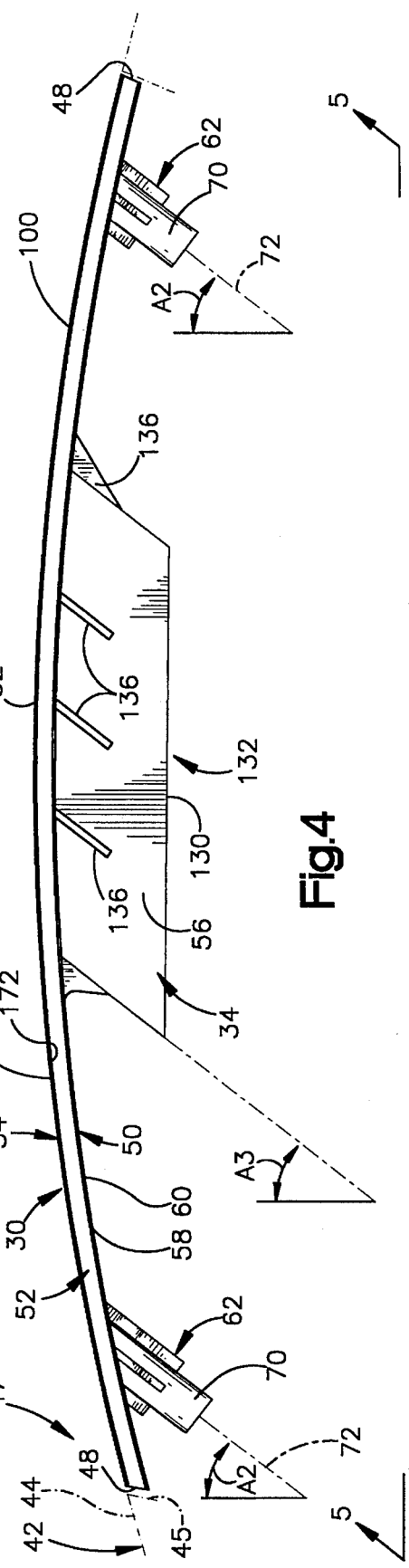

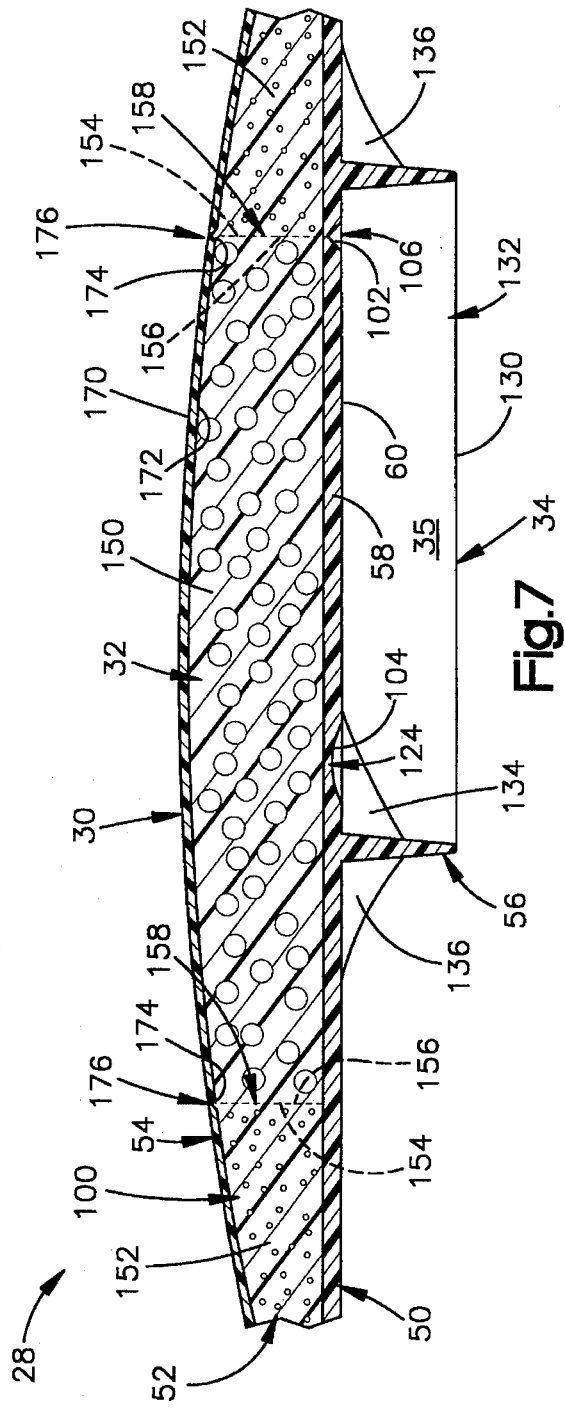
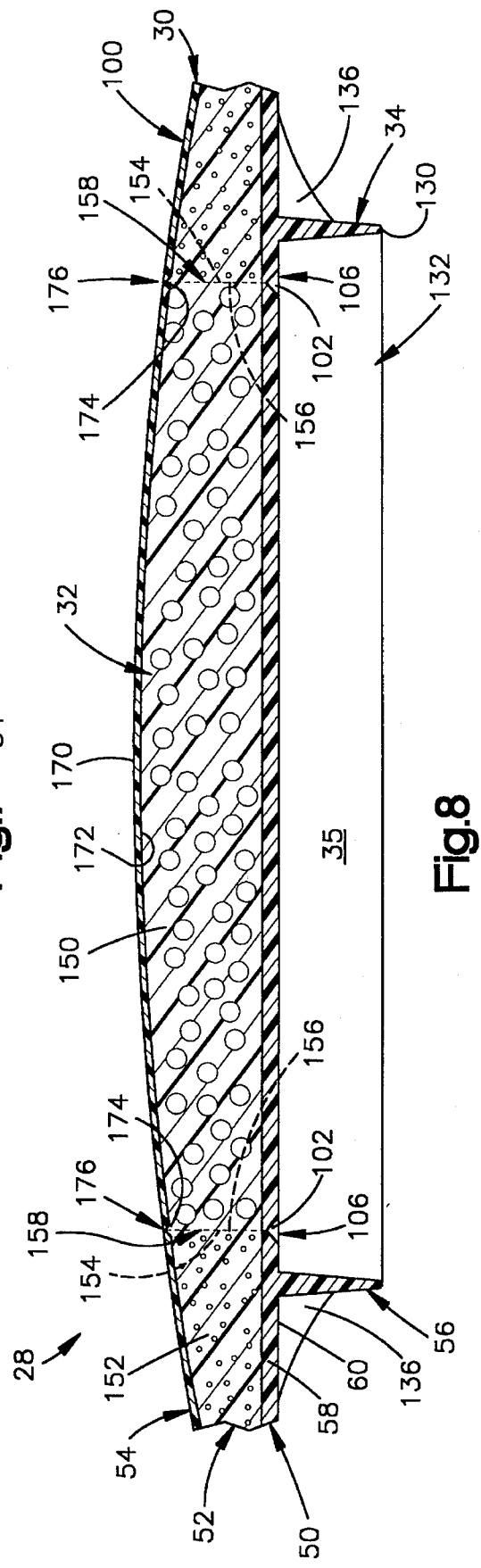

DEPLOYMENT DOOR ASSEMBLY

FIELD OF THE INVENTION

The present invention relates to a deployment door which is opened upon inflation of an air bag in a vehicle.

BACKGROUND OF THE INVENTION

An air bag is inflated to protect an occupant of a vehicle upon the occurrence of a vehicle collision. When the vehicle experiences a collision-indicating condition of at least a predetermined threshold level, an inflator is actuated. The inflator then emits inflation fluid which is directed to flow into the air bag. The inflation fluid inflates the air bag to an inflated condition in which the air bag extends into the vehicle occupant compartment. When the air bag is inflated into the vehicle occupant compartment, it restrains the occupant of the vehicle from forcefully striking parts of the vehicle as a result of the collision.

The air bag and the inflator are typically assembled together as parts of an air bag module which is mounted in the vehicle. In addition to the air bag and the inflator, the module includes a reaction canister which contains the air bag and the inflator. The reaction canister has a deployment opening through which the air bag emerges from the reaction canister when the air bag is being inflated.

A deployment door extends over the deployment opening in the reaction canister to conceal the air bag and the other parts of the module from the vehicle occupant compartment. The deployment door may be a part of the module. Alternatively, the deployment door may be a part of a trim panel on the vehicle structure in which the nodule is mounted. For example, the deployment door may be a part of a trim panel on the vehicle instrument panel.

When the inflator is actuated, the reaction canister directs the inflation fluid to flow from the inflator into the air bag. As the inflation fluid enters the air bag, it moves the air bag outward from the reaction canister through the deployment opening and forcefully against the deployment door. A closure portion of the deployment door is ruptured by the force of the fluid pressure in the air bag. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag is inflated outward from the reaction canister through the deployment opening and into the vehicle occupant compartment.

SUMMARY OF THE INVENTION

The present invention comprises an apparatus for use with an inflatable vehicle occupant restraint. In accordance with the present invention, the apparatus comprises deployment means for rupturing under the influence of the restraint when the restraint is being inflated.

The deployment means comprises a plastic part. The plastic part has a seam along which it is rupturable under stress induced by movement of the restraint forcefully against the deployment means. The plastic part includes first and second bodies of plastic foam which are joined to each other at the seam.

In a preferred embodiment of the present invention, the first body of plastic foam has a first durometer hardness. The second body of plastic foam has a second durometer hardness which is unequal to the first durometer hardness. The difference in durometer hardness between the two bodies of plastic foam causes the shear strength of the plastic part to be lowest at the seam. This helps to ensure that the plastic part will rupture at the location of the seam when the restraint is being inflated.

BRIEF DESCRIPTION OF THE DRAWINGS

Further features of the present invention will become apparent to those skilled in the art to which the present invention relates from reading the following description with reference to the accompanying drawings, in which:

FIG. 3 is a perspective view of parts shown in FIG. 1;

FIG. 4 is a view taken on line 4—4 of FIG. 3;

FIG. 7 is a view taken on line 7—7 of FIG. 5; and

FIG. 8 is a view taken on line 8—8 of FIG. 5.

DESCRIPTION OF A PREFERRED EMBODIMENT

Figure 1:
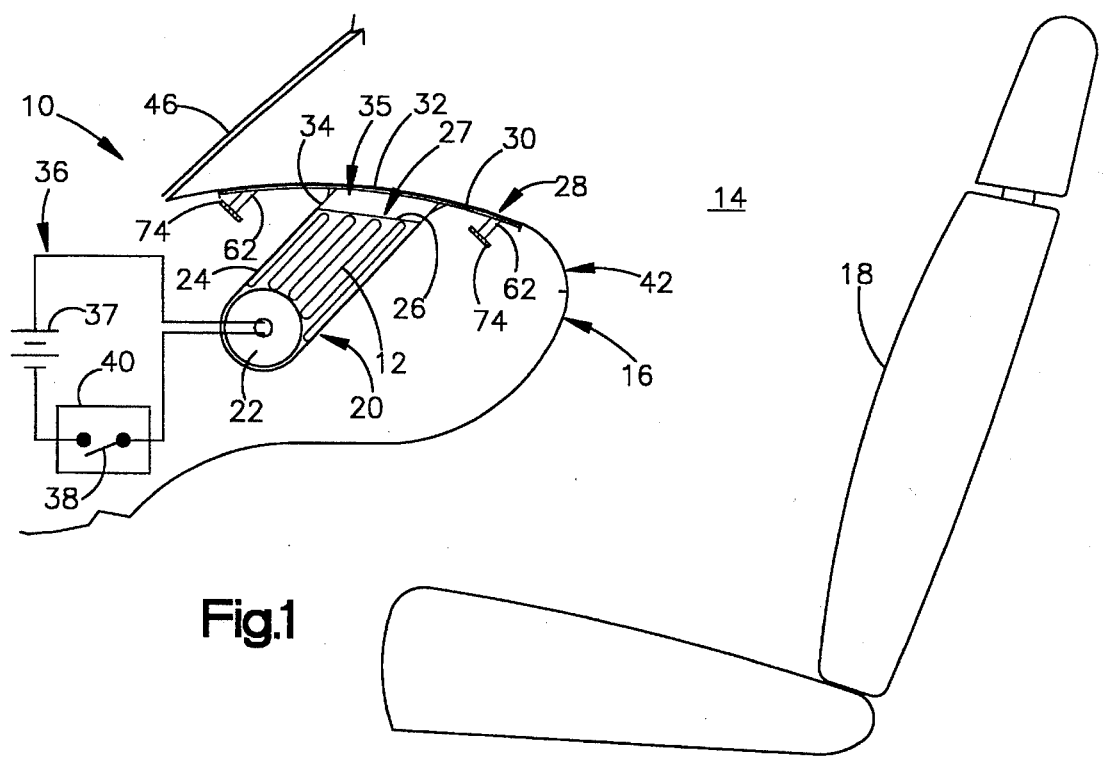
FIG. 1 is a schematic view showing a vehicle occupant restraint apparatus comprising a preferred embodiment of the present invention.
Figure 2:
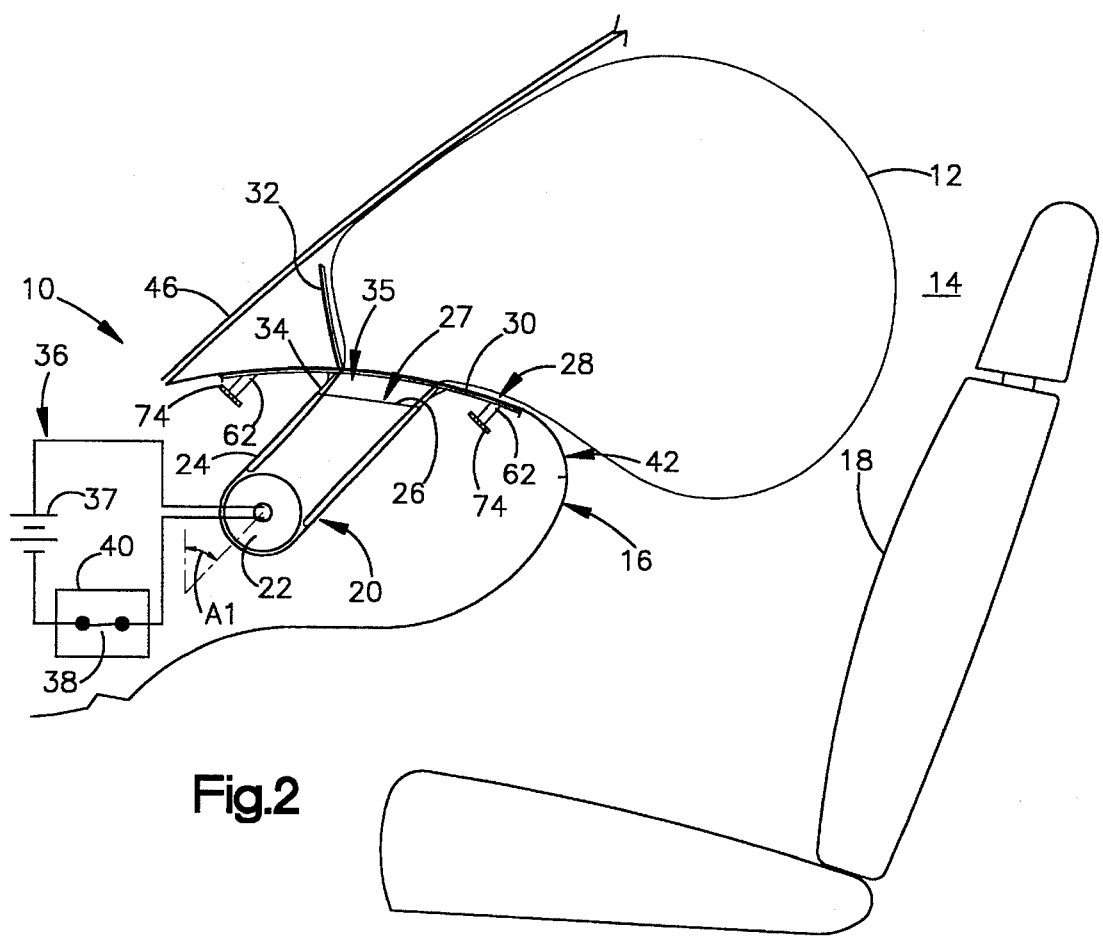
FIG. 2 is a schematic view showing the apparatus of FIG. 1 in an actuated condition.

A vehicle occupant restraint apparatus 10 comprising a preferred embodiment of the present invention is shown schematically in FIGS. 1 and 2. The apparatus 10 includes a particular type of inflatable vehicle occupant restraint 12 which is commonly referred to as an air bag. The air bag 12 is inflatable from an uninflated condition, as shown in FIG. 1, to an inflated condition, as shown in FIG. 2. When the air bag 12 is being inflated, it moves into the vehicle occupant compartment 14 between the vehicle instrument panel 16 and an adjacent vehicle seat 18. The air bag 12 then restrains movement of an occupant of the seat 18 toward the instrument panel 16 to help protect the occupant from a forceful impact with the instrument panel 16 or other parts of the vehicle.

The air bag 12 is part of an air bag module 20 which is mounted in the instrument panel 16 at the passenger side of the vehicle. In addition to the air bag 12, the module 20 includes an inflator 22 for inflating the air bag 12, and includes a reaction canister 24 which contains the air bag 12 and the inflator 22. The air bag 12 and the inflator 22 are fixed to the reaction canister 24 in a known manner, and the reaction canister 24 is mounted in the instrument panel 16 in a known manner. An outer end 26 of the reaction canister 24 is open so as to define a deployment opening 27 through which the air bag 12 emerges from the reaction canister 24 when inflating. Although the reaction canister 24 in the preferred embodiment of the present invention is a separate structure which is mounted in the instrument panel 16, such a canister could alternatively be defined by the structure of the instrument panel 16, or by another part of the vehicle from which the air bag 12 is to be inflated into the vehicle occupant compartment 14.

The apparatus 10 further includes a deployment door assembly 28 which is mounted on the instrument panel 16. The deployment door assembly 28 includes a deployment panel 30 which, in turn, includes a door panel 32. The deployment panel 30 covers the module 20 to conceal the module 20 from the vehicle occupant compartment 14. The door panel 32 is pivotal from a closed position, as shown in FIG. 1, to an opened position, as shown in FIG. 2. A base 34 of the deployment door assembly 28 extends inward from the deployment panel 30 to the module 20. The base 34 defines a chute 35 through which the inflating air bag 12 moves from the deployment opening 27 to the door panel 32.

The inflator 22 comprises a source of inflation fluid for inflating the air bag 12. As known in the art, the inflator 22 may contain an ignitable gas generating material which, when ignited, rapidly generates a large volume of gas. The inflator 22 may alternatively contain a stored quantity of pressurized inflation fluid, or a combination of pressurized inflation fluid and ignitable material for heating the inflation fluid.

The inflator 22 is included in an electrical circuit 36. The electrical circuit 36 further includes a power source 37, which is preferably the vehicle battery and/or a capacitor, and a normally open switch 38. The switch 38 is part of a sensor 40 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 12 is desired to protect an occupant of the vehicle. The sensor 40 then closes the switch 38, and the inflator 22 is actuated electrically.

When the inflator 22 is actuated, it emits a large volume of inflation fluid into the reaction canister 24. The reaction canister 24 directs the inflation fluid from the inflator 22 into the air bag 12 to inflate the air bag 12. As the inflation fluid begins to inflate the air bag 12, it moves the air bag 12 rapidly outward through the chute 35 and forcefully against the door panel 32. The air bag 12 then pivots the door panel 32 outward from the closed position to the opened position. As the inflation fluid continues to inflate the air bag 12, it moves the air bag 12 outward into the vehicle occupant compartment 14 past the door panel 32.

As shown in FIGS. 1 and 2, the air bag 12 is inflated outward from a portion 42 of the instrument panel 16 which is known as a topper pad. As shown in FIG. 3, the topper pad 42 has an upper surface 44 and an inner edge surface 45. The upper surface 44 of the topper pad 42 faces upward into the vehicle occupant compartment 14, and faces partially toward the vehicle windshield 46 (FIGS. 1 and 2). The inner edge surface 45 of the topper pad 42 defines a rectangular opening 47.

The deployment door assembly 28 has a rectangular peripheral shape defined by a peripheral edge surface 48 of the deployment panel 30. The peripheral edge surface 48 of the deployment panel 30 is located closely adjacent to the inner edge surface 45 of the topper pad 42. The deployment panel 30 thus closes the opening 47 in the topper pad 42 and continues the contour of the topper pad 42 across the opening 47. In this arrangement, the door panel 32 faces partially toward the windshield 46. More specifically, the air bag 12 is inflated at a deployment angle A1 (FIG. 2) which is measured from a vertical line and which directs the air bag 12 into contact with the windshield 46. Tethers or the like (not shown) can be used to control interaction of the inflating air bag 12 with the windshield 46 in any suitable manner known in the art.

The deployment door assembly 28 is a unitary structure comprising several interconnected parts. As shown in FIG. 4, the parts of the deployment door assembly 28 include a substrate 50, an intermediate layer 52, and a cover layer 54.

The substrate 50 can be formed of any suitable material known in the art, such as plastic or metal, and could include one or more pieces of such materials. In the preferred embodiment of the present invention, the substrate 50 is constructed as a single body of molded plastic material. The plastic material of which the substrate 50 is formed may have any suitable composition known in the art. A base portion 56 of the substrate 50 defines the base 34 of the deployment door assembly 28. A panel portion 58 of the substrate 50 defines an inner side surface 60 of the deployment panel 30. A plurality of mounting bosses 62 are integral portions of the substrate 50, and project inward from the inner side surface 60.

Each mounting boss 62 has a cylindrical outer surface 70 centered on a respective axis 72. The axes 72 are generally parallel to each other. When the deployment door assembly 28 is mounted on the instrument panel 16, as shown in FIG. 4, each axis 72 is inclined from a vertical line at an angle A2. The angles A2 are equal to each other, and are equal to the deployment angle A1 (FIG. 2) of the air bag 12.

Figure 6A:
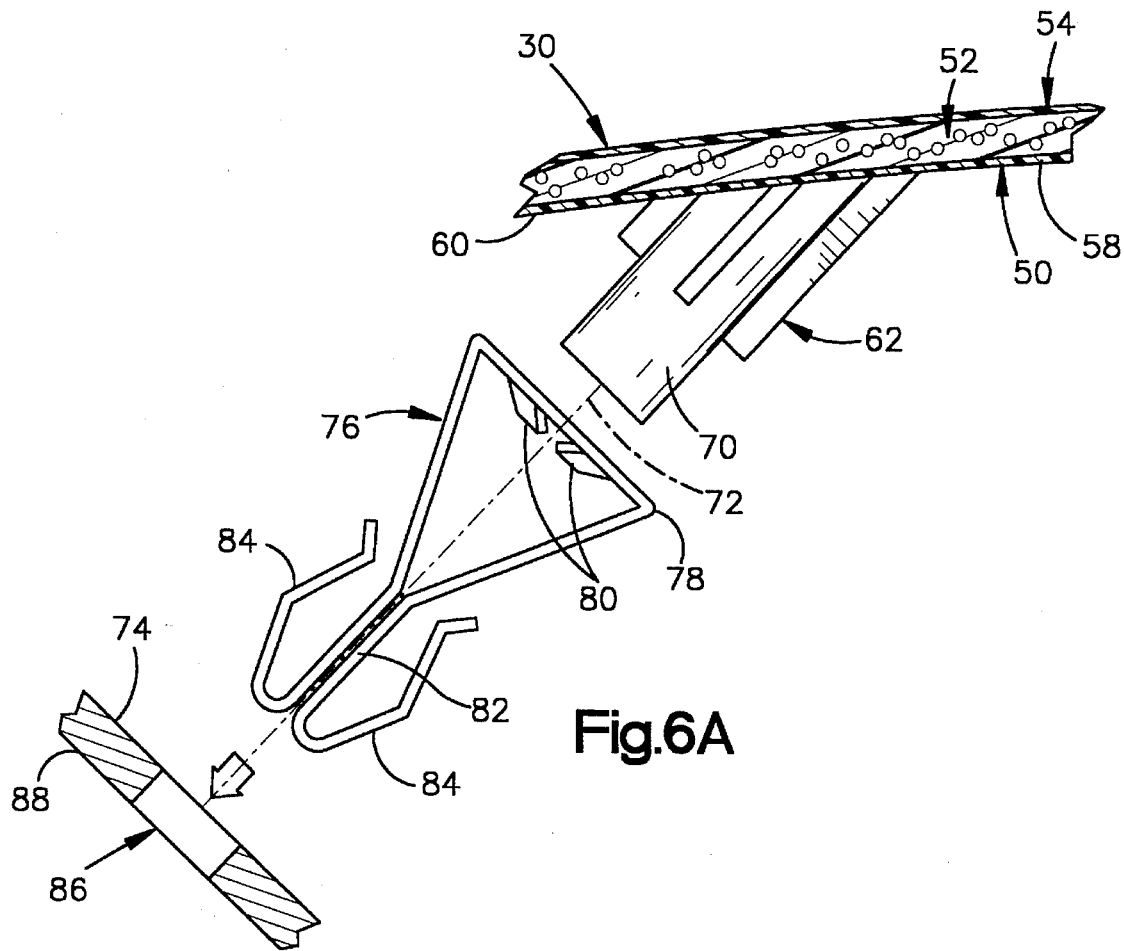
FIGS. 6A and 6B are partial side views showing parts of the apparatus of FIG. 1.
Figure 6B:
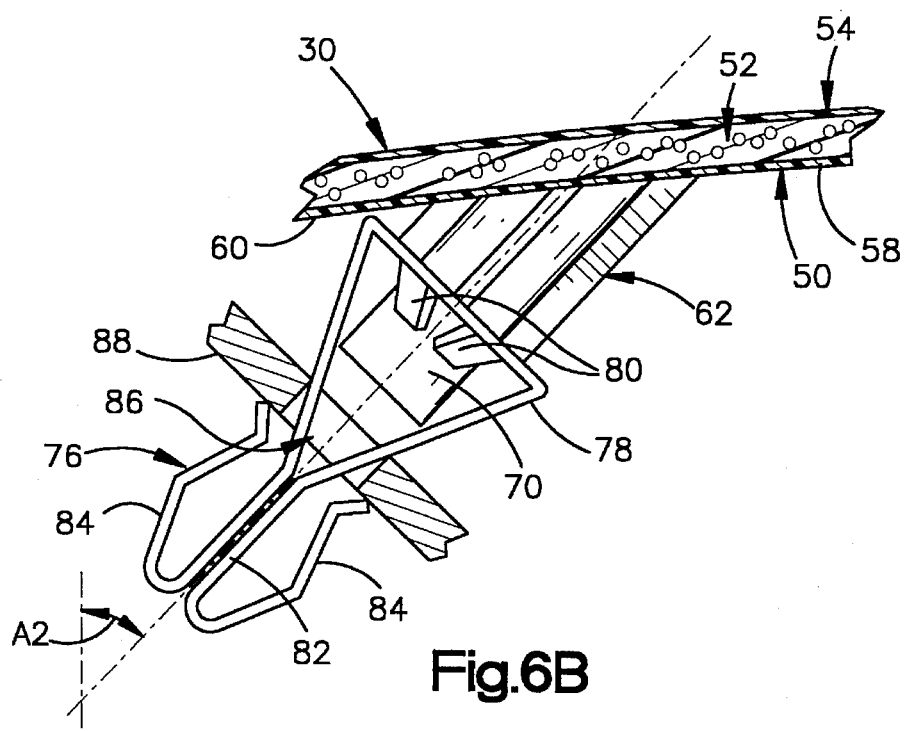

The deployment door assembly 28 is preferably fastened to portions 74 of the instrument panel 16 which are spaced from the reaction canister 24, as shown in FIG. 1. Each mounting boss 62 is fastened directly to a corresponding portion 74 of the instrument panel 16 by a corresponding fastener 76, as shown in FIGS. 6A and 6B. Each fastener 76 has a head 78 with a plurality of barbs 80, and has a stem 82 with a pair of spring arms 84.

When the head 78 of a fastener 76 is received over the corresponding mounting boss 62, as shown in FIG. 6B, the barbs 80 cut into the mounting boss 62 at the cylindrical outer surface 70 so as to block removal of the fastener 76 from the mounting boss 62. The stem 82 of the fastener 76 is receivable through an aperture 86 in the corresponding portion 74 of the instrument panel 16, as indicated by the arrow shown in FIG. 6A. When the stem 82 is moved through the aperture 86, the spring arms 84 are first deflected toward each other, and subsequently move resiliently away from each other to the positions in which they are shown in FIG. 6B. The spring arms 84 then engage an inner surface 88 of the corresponding portion 74 of the instrument panel 16 so as to block removal of the stem 82 from the aperture 86. Each fastener 76 fastens the corresponding mounting boss 62 securely to the instrument panel 16 in this manner. Although the foregoing structures of the mounting bosses 62 and the fasteners 76 are preferred, any suitable alternative structures may be used.

As shown as dashed lines in FIG. 3, the door panel 32 has a generally rectangular peripheral shape and is located at the center of the deployment panel 30. The door panel 32 could be offset from the center of the deployment panel 30, depending upon considerations such as the orientation of the topper pad 42 relative to the vehicle occupant compartment 14, and/or the deployment angle A1 (FIG. 2) of the air bag 12. In any case, the door panel 32 is fully surrounded by a rectangular, frame-shaped peripheral portion 100 of the deployment panel 30.

Figure 5:
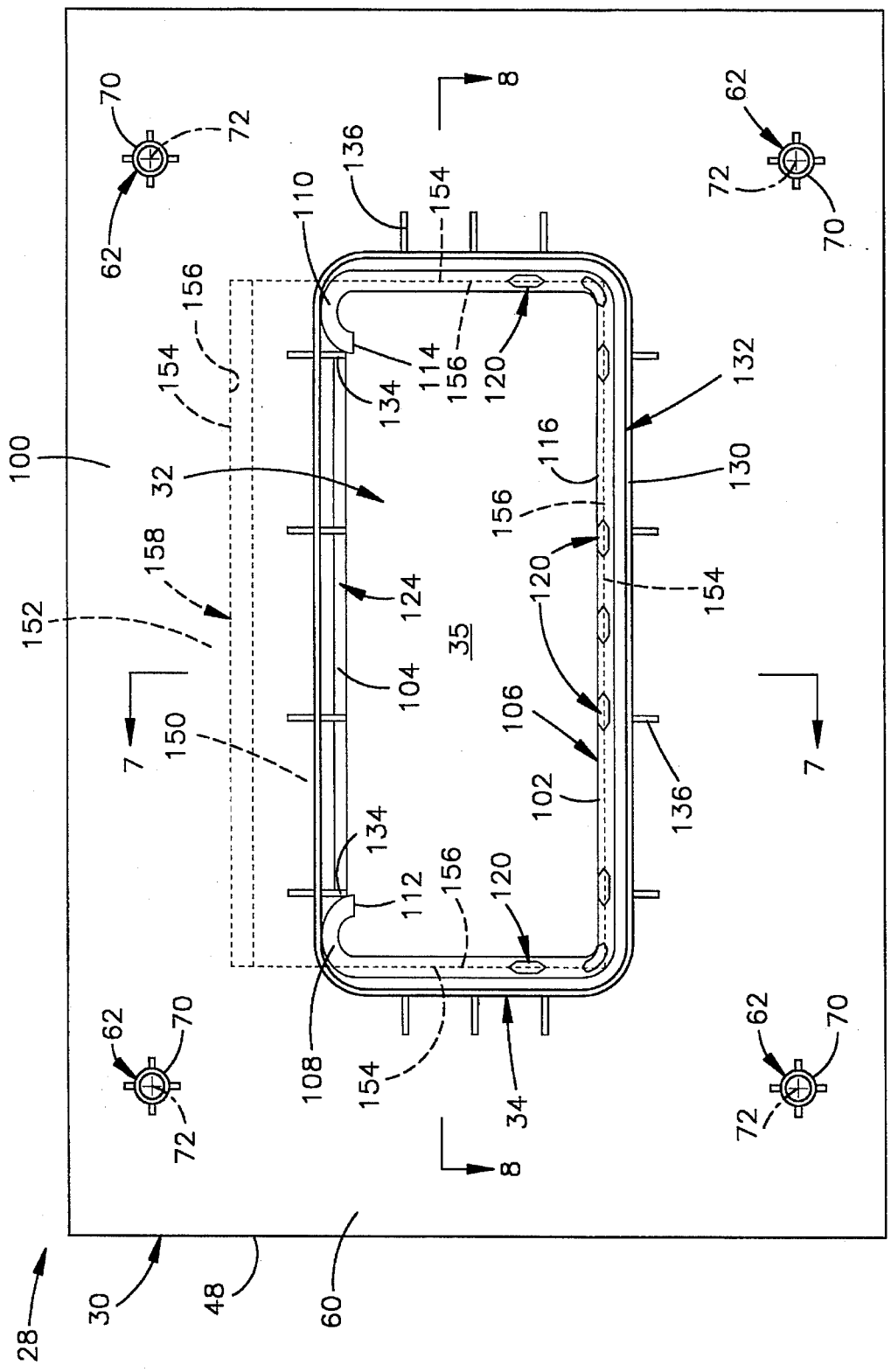
FIG. 5 is a view taken on line 5—5 of FIG. 4.

As shown in FIG. 5, the outline of the door panel 32 is visible at the inner side surface 60 of the deployment panel 30. This is because the substrate panel portion 58 has a pair of recessed surfaces 102 and 104 which together extend fully around the perimeter of the door panel 32. The first recessed surface 102 defines a thin section 106 of the substrate panel 58 which functions as a stress riser. The stress riser 106 has opposite end portions 108 and 110. The opposite end portions 108 and 110 of the stress riser 106 extend along semi-circular, hook-shaped paths to respective opposite terminal ends 112 and 114 of the stress riser 106. A major portion 116 of the stress riser 106 extends between the opposite end portions 108 and 110 in a U-shaped path extending along three sides of the door panel 32. A plurality of initiator openings 120 are spaced apart along the length of the stress riser 106. Each initiator opening 120 extends fully through the stress riser 106 so as to define a corresponding gap in the plastic material of the substrate panel 58.

The second recessed surface 104 defines another thin section 124 of the substrate panel 58. The thin section 124 extends in a straight line between the opposite end portions 108 and 110 of the stress riser 106, and functions as a bendable hinge at a corresponding side of the door panel 32. The thickness of the hinge 124 is somewhat less than the thickness of the adjacent portions of the substrate panel 58 on opposite sides of the hinge 124. This promotes bending at the hinge 124 when the inflating air bag 12 opens the door panel 32, as described fully below. Moreover, the hinge 124 is both wider and thicker than the stress riser 106. This helps to ensure that the force of the inflating air bag 12 ruptures the substrate panel 58 at the stress riser 106 rather than at the hinge 124. Such rupturing also is described fully below.

The base 34 of the deployment door assembly 28 is a generally rectangular wall structure which closely surrounds the door panel 32, the stress riser 106, and the hinge 124. A lower edge surface 130 of the base 34 defines an opening 132 which extends fully across the base 34. The opening 132 defines an inner end of the chute 35. The size and shape of the opening 132 at the inner end of the chute 35 are approximately equal to the size and shape of the deployment opening 27 at the outer end 26 of the reaction canister 24 (FIG. 1). When the deployment door assembly 28 is mounted on the instrument panel 16 (FIG. 4), the base 34 is inclined at an angle A3 which is equal to the deployment angle A1 (FIG. 2) of the air bag 12. Since the angles A1, A2 and A3 are equal to each other, the mounting bosses 62 and the base 34 can be removed together from a mold cavity in a single direction. This simplifies the process of forming the substrate 50 as a continuous body of molded plastic material.

In the preferred embodiment of the present invention, the substrate 50 further includes a plurality of generally triangular gussets extending between the substrate panel 58 and the base 34. These include inner gussets 134 at the inside of the base 34, and outer gussets 136 at the outside of the base 34. The inner gussets 134 extend across the hinge 124 and are perpendicular to the hinge 124. One inner gusset 134 adjoins the first hook-shaped end portion 108 of the stress riser 106. Another inner gusset 134 adjoins the second hook-shaped end portion 110 of the stress riser 106.

The intermediate layer 52 of the deployment door assembly 28 extends fully throughout the length and width of the deployment panel 30 in overlying contact with the substrate panel 58. As best shown in the sectional views of FIGS. 7 and 8, the intermediate layer 52 is a unitary plastic part comprising first and second bodies 150 and 152 of plastic foam which are joined to each other.

As shown in dashed lines in FIG. 5, the first body 150 of plastic foam has a peripheral edge 154, and has a rectangular peripheral shape defined by the peripheral edge 154. The peripheral edge 154 extends continuously around three sides of the door panel 32 in a U-shaped path adjacent to the major portion 116 of the stress riser 106 in the substrate panel 58. The peripheral edge 154 further extends away from the door panel 32 beyond each of the opposite end portions 108 and 110 of the stress riser 106 in directions perpendicular to the hinge 124. The first body 150 of plastic foam thus has a length which is equal to the length of the door panel 32, and has a width which is greater than the width of the door panel 32. In this configuration, the first body 150 of plastic foam extends fully throughout the length and width of the door panel 32, and projects transversely across the hinge 124 from the door panel 32 to the peripheral frame portion 100 of the deployment panel 30.

The second body 152 of plastic foam has an inner edge 156. The inner edge 156 of the second body 152 of plastic foam adjoins the peripheral edge 154 of the first body 150 fully around the perimeter of the first body 150. A seam 158 is defined at the interface of the adjoining edges 154 and 156 of the two bodies 150 and 152 of plastic foam. The intermediate layer 52 is continuous across the seam 158 as a result of bonding that occurs upon formation of the two bodies 150 and 152 of plastic foam in a molding process.

The foregoing structure of the intermediate layer 52 can be formed by the use of any suitable molding process and apparatus known in the art. Each of the two bodies 150 and 152 of plastic foam can be formed of any suitable plastic material known in the art. Accordingly, the two bodies 150 and 152 of plastic foam may be formed of either the same or differing plastic materials. However, regardless of the composition of the plastic materials of which they are formed, the first and second bodies 150 and 152 of plastic foam are constructed to have respective values of durometer hardness which differ from each other. As a result of the difference in durometer hardness between the two bodies 150 and 152 of plastic foam, the intermediate layer 52 is relatively weak at the seam 158 between the two bodies 150 and 152 of plastic foam. More specifically, the shear strength of the intermediate layer 52 is lowest at the seam 158.

The cover layer 54 defines an outer side surface 170 of the deployment panel 30. Like the substrate 50, the cover layer 54 is preferably constructed as a single body of molded plastic material. The plastic material of which the cover layer 54 is formed may have any suitable composition known in the art, but preferably is the same as the plastic material at the surrounding surface 44 of the topper pad 42 (FIG. 3). Additionally, the texture and/or the color of the surface 170 preferably matches that of the surface 44 so that the deployment panel 30 continues the trim theme of the topper pad 42 on the instrument panel 16.

An inner side surface 172 of the cover layer 54 has a recessed portion 174 defining a stress riser 176. The stress riser 176 in the cover layer 54 extends around three sides of the door panel 32 coextensively with the seam 158 in the intermediate layer 52. Accordingly, the seam 158 and stress risers 176 and 106 extend around three sides of the door panel 32 along adjacent U-shaped paths that are coextensive with each other. In this configuration, the seam 158 and the stress risers 106 and 176 together define a rupturable boundary at which the door panel 32 is severable from the peripheral frame portion 100 of the deployment panel 30. The contour of the outer side surface 170 is preferably unaffected by the structure of the stress riser 176 so that the outline of the door panel 32 is not visible at the outer side surface 170.

When the air bag 12 is inflated upon the occurrence of a vehicle collision, as described above with reference to FIGS. 1 and 2, the base 34 of the deployment door assembly 28 directs the air bag 12 to move outward through the chute 35 from the deployment opening 27 to the deployment panel 30. The inflation fluid in the air bag 12 then causes the air bag 12 to apply a fluid pressure force to the deployment panel 30 at the inner side surface 60. This induces shear stress across the thickness of the deployment panel 30.

The shear stress acting across the thickness of the substrate panel 58 causes the plastic material of the substrate panel 58 to rupture at the stress riser 106. A tear then propagates through the substrate panel 58 along the length of the stress riser 106. The tear begins at the initiator openings 120, and continues throughout the major portion 116 of the stress riser 106 along the three corresponding sides of the door panel 32. The tear further continues around each of the opposite end portions 108 and 110 toward the corresponding terminal ends 112 and 114 of the stress riser 106.

In the preferred embodiment of the present invention, the stress riser 106 ends abruptly at its opposite terminal ends 112 and 114 so that the full thickness of the substrate panel 58 is provided at the terminal ends 112 and 114 to resist propagation of the tear beyond those locations. The stress riser 106 could alternatively be tapered along the lengths of its opposite end portions 108 and 110 so as to approach the full thickness of the substrate panel 58 gradually along the lengths of the opposite end portions 108 and 110. Additionally, the hook-shaped paths of the opposite end portions 108 and 110 of the stress riser 106 direct the tear to propagate in directions that turn away from the hinge 124. This helps to ensure that the hinge 124 is not ruptured. Moreover, the inner gussets 134 adjoining the opposite end portions 108 and 110 of the stress riser 106 block propagation of the tear in directions extending along the hinge 124.

As described above, the shear strength of the intermediate layer 52 is lowest at the seam 158 between the first and second bodies 150 and 152 of plastic foam. Therefore, when the deployment panel 30 has been ruptured at the stress riser 106 in the substrate panel 58 in the foregoing manner, the deployment panel 30 further ruptures at the seam 158 in the intermediate layer 52. The first body 150 of plastic foam is then severed from the second body 152 around the three sides of the door panel 32 at which the seam 158 adjoins the stress riser 106. The cover layer 54 is likewise ruptured along the length of the stress riser 176. The three corresponding sides of the door panel 32 are thus severed from the surrounding frame portion 100 of the deployment panel 30. The door panel 32 is then free to move pivotally from the closed position of FIG. 1 to the opened position of FIG. 2 under the influence of the inflating air bag 12. Such pivotal movement of the door panel 32 is guided by bending of the substrate panel 58 at the hinge 124, and by simultaneous bending of the intermediate layer 52 and the cover layer 54 adjacent to the hinge 124.

The present invention has been described with reference to a preferred embodiment. From the foregoing description of the invention, those skilled in the art will perceive improvements, changes and modifications. For example, the shapes and sizes of the deployment panel, the door panel, and the rupturable boundary of the door panel could vary. The deployment door assembly could have a different location on the instrument panel, such as a mid-mount location. Additionally, a vehicle occupant restraint system may include one or more air bags that inflate upon the occurrence of front, rear, and/or side impacts to the vehicle. The air bags can be mounted in parts of the vehicle other than the instrument panel. Such other parts of the vehicle include, for example, the doors, the pillars, the roof, and the seats. A deployment door assembly comprising the present invention could be used with an air bag and the corresponding vehicle trim structure at any of those locations. A deployment door assembly comprising the present invention could also be used with a driver's side air bag on a vehicle steering column. Such improvements, changes and modifications within the skill of the art are intended to be covered by the appended claims.

Having described the invention, the following is claimed:

1. Apparatus for use with an inflatable vehicle occupant restraint, said apparatus comprising:

deployment means for rupturing under the influence of the restraint when the restraint is being inflated;

said deployment means comprising a plastic part having a seam along which said plastic part is rupturable under stress induced by movement of the restraint forcefully against said deployment means, said plastic part including first and second bodies of plastic foam which are joined to each other at said seam;

said first body of plastic foam having a first durometer hardness, said second body of plastic foam having a second durometer hardness unequal to said first durometer hardness.

2. Apparatus as defined in claim 1 wherein said deployment means defines a pivotal door panel and a frame structure surrounding said door panel, said first body of plastic foam comprising a portion of said door panel, said second body of plastic foam comprising a portion of said frame structure.

3. Apparatus as defined in claim 1 wherein said deployment means includes hinge means for guiding pivotal movement of said door panel to an opened position, said seam extending around said door panel between opposite ends of said hinge means.

4. Apparatus as defined in claim 3 wherein said first body of plastic foam extends across said hinge means from said door panel to said frame structure.

5. Apparatus as defined in claim 1 wherein said first and second bodies of plastic foam have first and second edges, respectively, said first and second edges adjoining each other and being bonded together to define an interface at which said first and second bodies of plastic foam are joined to each other, said interface defining said seam.

6. Apparatus as defined in claim 5 wherein said first edge is a peripheral edge defining the perimeter of said first body of plastic foam, said second edge being an inner edge adjoining said peripheral edge fully around said perimeter.

7. Apparatus as defined in claim 6 wherein said deployment means defines a pivotal door panel, a bendable hinge for said door panel, and a frame structure surrounding said door panel, said first body of plastic foam extending across said hinge from said door panel to said frame structure.

8. Apparatus for use with an inflatable vehicle occupant restraint, said apparatus comprising:

deployment means for rupturing under the influence of the restraint when the restraint is being inflated;

said deployment means comprising a plastic part having a seam along which said plastic part is rupturable under stress induced by movement of the restraint forcefully against said deployment means, said plastic part including first and second bodies of plastic foam which are joined to each other at said seam;

said deployment means comprises a pivotal door panel, a substrate, and means for defining a rupturable portion of said substrate which extends partially around said door panel, said plastic part overlying said substrate with said seam extending partially around said door panel adjacent to said rupturable portion of said substrate;

said first body of plastic foam having a first durometer hardness, said second body of plastic foam having a second durometer hardness unequal to said first durometer hardness.

9. Apparatus as defined in claim 8 wherein said deployment means comprises a cover part and means for defining a rupturable portion of said cover part, said cover part overlying said plastic part with said rupturable portion of said cover part extending partially around said door panel adjacent to said seam.

10. Apparatus as defined in claim 8 wherein said first and second bodies of plastic foam have first and second edges, respectively, said first and second edges adjoining each other and being bonded together to define an interface at which said first and second bodies of plastic foam are joined to each other, said interface defining said seam.

11. Apparatus as defined in claim 10 wherein said first edge is a peripheral edge defining the perimeter of said first body of plastic foam, said second edge being an inner edge adjoining said peripheral edge fully around said perimeter.

12. Apparatus for use with an inflatable vehicle occupant restraint, said apparatus comprising:

a deployment structure which is rupturable under the influence of the restraint when the restraint is being inflated, said deployment structure comprising a plastic part having a seam along which said plastic part is rupturable under stress induced by movement of the restraint forcefully against said deployment structure;

said plastic part including first and second bodies of plastic foam having first and second edges, respectively, said first and second edges adjoining each other and being bonded together to define an interface at which said first and second bodies of plastic foam are joined to each other, said interface defining said seam.

13. Apparatus as defined in claim 12 wherein said first edge is a peripheral edge defining the perimeter of said first body of plastic foam, said second edge being an inner edge adjoining said peripheral edge fully around said perimeter.

14. Apparatus as defined in claim 13 wherein said deployment structure defines a pivotal door panel, a bendable hinge for said door panel, and a frame structure surrounding said door panel, said first body of plastic foam extending across said hinge from said door panel to said frame structure.

15. Apparatus as defined in claim 12 wherein said deployment structure comprises a pivotal door panel, a substrate, and means for defining a rupturable portion of said substrate which extends partially around said door panel, said plastic part overlying said substrate with said seam extending partially around said door panel adjacent to said rupturable portion of said substrate, said deployment structure further comprising a cover part and means for defining a rupturable portion of said cover part, said cover part overlying said plastic part with said rupturable portion of said cover part extending partially around said door panel adjacent to said seam.

* * * * *

UNITED STATES PATENT AND TRADEMARK OFFICE
CERTIFICATE OF CORRECTION

PATENT NO. : 5,590,903
DATED : January 7, 1997
INVENTOR(S) : Jack A. Phillion and Scott A. Kelley It is certified that error appears in the above-indentified patent and that said Letters Patent is hereby corrected as shown below:

Column 8, line 25, change "1" to --2--.

Signed and Sealed this

Third Day of June, 1997

Attest:

BRUCE LEHMAN

Attesting Officer

Commissioner of Patents and Trademarks